(12) United States Patent
Miles (10) Patent No.: US 11,472,342 B2
(45) Date of Patent: Oct. 18, 2022

(54) VEHICLE MIRRORS

(71) Applicant: Shane Robert Miles, Arundel (AU)

(72) Inventor: Shane Robert Miles, Arundel (AU)

(*) Notice: Subject to any disclaimer, the term of this patent is extended or adjusted under 35 U.S.C. 154(b) by 0 days.

(21) Appl. No.: 16/465,924

(22) PCT Filed: Nov. 30, 2017

(86) PCT No.: PCT/AU2017/051320
§ 371 (c)(1),
(2) Date: May 31, 2019

(87) PCT Pub. No.: WO2018/098530
PCT Pub. Date: Jun. 7, 2018

(65) Prior Publication Data
US 2019/0291644 A1  Sep. 26, 2019

(30) Foreign Application Priority Data

Dec. 1, 2016  (AU) .............................. 2016904946

(51) Int. Cl.
*B60R 1/078* (2006.01)
(52) U.S. Cl.
CPC ................... *B60R 1/078* (2013.01)
(58) Field of Classification Search
CPC .............................. B60R 1/078; B60R 1/0617
See application file for complete search history.

(56) References Cited

U.S. PATENT DOCUMENTS

| 2,596,632 | A | * | 5/1952 | Whitehead | B60R 1/078 248/279.1 |
| 2,717,531 | A | * | 9/1955 | Schenck | B60R 1/078 74/503 |
| 3,482,811 | A | * | 12/1969 | Zent | B60R 1/078 248/480 |
| 4,711,538 | A | * | 12/1987 | Ohs | G02B 7/1824 248/298.1 |
| 4,730,913 | A | * | 3/1988 | Boothe | G02B 7/1824 248/298.1 |
| 6,024,459 | A | | 2/2000 | Lewis | |
| 6,213,609 | B1 | * | 4/2001 | Foote | B60R 1/074 359/841 |
| 6,239,928 | B1 | * | 5/2001 | Whitehead | B60R 1/078 359/871 |
| 6,394,616 | B1 | * | 5/2002 | Foote | B60R 1/074 248/480 |

(Continued)

OTHER PUBLICATIONS

International Search Report and Written Opinion for PCT/AU2017/051320 dated Apr. 9, 2018.

*Primary Examiner* — Bradley Duckworth
(74) *Attorney, Agent, or Firm* — Tumey L.L.P.

(57) ABSTRACT

A towing mirror including: a mount adapted to be mounted to a vehicle cabin; an extension component including a first member or portion extending from said mount and a second member operatively connected to said first member or portion for movement relative thereto from a retracted position to an extended position; and a mirror component operatively connected to said second member for pivoting movement relative thereto about a generally horizontal axis extending substantially in the intended direction of travel of the vehicle cabin to which the mirror is to be mounted.

17 Claims, 10 Drawing Sheets

(56) References Cited

U.S. PATENT DOCUMENTS

| | | | | |
|---|---|---|---|---|
| 6,672,726 B1* | 1/2004 | Boddy | ................... | B60R 1/078 |
| | | | | 359/841 |
| 6,820,987 B1* | 11/2004 | Lewis | .................. | B60Q 1/2665 |
| | | | | 359/850 |
| 6,851,813 B2 | 2/2005 | Vandenbrink | | |
| 7,350,931 B1 | 4/2008 | Peterson et al. | | |
| 7,441,910 B1 | 10/2008 | Peterson et al. | | |
| 7,490,946 B1 | 2/2009 | Foote et al. | | |
| 7,594,731 B2 | 9/2009 | Sinelli et al. | | |
| 9,057,833 B2* | 6/2015 | Bowers | ..................... | B60R 1/06 |
| 9,969,333 B2* | 5/2018 | Ervin | ....................... | B60R 1/07 |
| 2008/0030885 A1 | 2/2008 | Peterson et al. | | |

\* cited by examiner

VEHICLE MIRRORS

This invention relates to vehicle mirrors and in particular mirrors of the type which are mounted outside the cabin and more particularly those mirrors known as "towing mirrors".

Towing mirrors are typically fitted to vehicles when towing caravans, fifth wheelers or other vehicles in order to extend the rearward line of sight of the driver beyond the caravan or other vehicle being towed. Towing vehicles may be a two wheel drive vehicle such as a sedan but in recent years with the advent of larger caravans and off-road destinations, the towing vehicle is typically a large four-wheel-drive vehicle such as a Toyota Land cruiser, Nissan Patrol, Ford F250 or the like and the caravan is typically significantly wider than the towing vehicle.

Historically, the caravanning public temporarily mounted towing mirrors to the driver side door of the towing vehicle for the journey to a holiday destination so that the driver could see following traffic and then removed them when the destination was reached so that the vehicle could be used at the destination or left them on if the vehicle was not needed. If the mirrors were removed upon reaching the destination they had to be refitted for the return journey which might be some two or three weeks later. However, nowadays, people seem to holiday by way of continual travel so that the caravan might be unhitched for only one or two days in many cases and the towing vehicle used for local sightseeing. Consequently the temporary towing mirrors have to be removed and replaced much more often and consequently the older style temporary towing mirrors are generally unsatisfactory. Moreover, nowadays there is considerably more traffic on the roads travelling at a greater speed than in earlier years and towing mirrors need to be more stable and more structurally sound.

In recent years, permanent towing mirrors have been developed which allow the mirror to be easily moved from a non-towing position to a towing position and vice versa. However, while such mirrors provide easier movement of the mirror, they generally do not meet the requirements of government authorities.

In that respect, Government authorities in some countries specify the maximum extent of a towing mirror beyond the cabin of the towing vehicle for the case when the vehicle is not towing and when it is towing. For example, the maximum extent of the mirror beyond the widest part of the cabin might be 150 mm when the vehicle is not towing anything and 390 mm when the vehicle is towing a caravan which might be necessary in order to give the driver vision beyond the caravan being towed. However, the permanent towing mirrors which are presently available do not meet the specifications and provide the necessary vision.

In this specification, the term "permanent towing mirror" is to be understood as referring to a towing mirror which is movable from a non-towing position to a towing position even though it may be removed entirely from the vehicle and replaced by the vehicle's own factory mirror when the vehicle is no longer being used to tow a caravan or the like.

The present invention is aimed at providing permanent towing mirrors which are adjustable from a non-towing (or stowed) position in which the mirror is closer to the vehicle cabin and a towing (or extended) position in which the mirror provides the desired rearward vision.

With the foregoing in view, the invention in one aspect resides broadly in a towing mirror including:
a mount adapted to be mounted to a vehicle cabin;
an extension component including a first member or portion extending from said mount and a second member operatively connected to said first member or portion for movement relative thereto from a retracted position to an extended position; and
a mirror component operatively connected to said second member for pivoting movement relative thereto about a generally horizontal axis extending substantially in the intended direction of travel of the vehicle cabin to which the mirror is to be mounted.

Suitably, the extension component is relatively short when in the retracted position and substantially longer when in the extended position.

In another aspect, the invention resides broadly in a towing mirror including:
a mount adapted to be mounted to a vehicle cabin;
an extension component including a first member operatively connected at one end to said mount for pivoting movement relative thereto about a generally vertical axis and a second member operatively connected to said first member for movement relative thereto from a retracted position to an extended position; and
a mirror component operatively connected to said second member for pivoting movement relative thereto about a generally horizontal axis extending substantially in the intended direction of travel of the vehicle cabin to which the mirror is to be mounted and spaced from said vertical axis.

Suitably, the extension component is relatively short when in the retracted position and substantially longer when in the extended position. That is to say, when the extension component is retracted it does not extend as far outwards from the side of the vehicle cabin as it does when in the extended position. In a preferred form, the extension component in the extended position is approximately twice the length of the extension component in the retracted position.

Preferably the mirror component is substantially rectangular in form and is operatively connected to said second component for pivoting movement about a pivot axis adjacent one end whereby it can move through an arc of up to 180° or even a full circle such that in one position at least a substantial part of the mirror component can overlie said second member of the extension component and in another position is substantially beyond said second member. Accordingly, the pivoting of the mirror component provides further extension outward from the vehicle whereby the driver of the vehicle is afforded a view through the mirror further back than in either the retracted or overlying positions of the extension component and/or mirror component respectively. For convenience, the position at which the mirror component overlies the second component will be referred to as the overlying position and the position where the mirror component is pivoted substantially beyond the second component will be referred to as the outlying position.

In one such preferred form where the horizontal pivot axis is adjacent one corner of the mirror component, the mirror component moves through an arc of 90° with the result that the mirror component is substantially above and outside beyond the pivot axis. Advantageously, such arrangement optimises the extension of the mirror component laterally from the vehicle cabin and optimises the mount position on the cabin by being lower on the cabin wall where the wall is structurally stronger or at least has room for in wall reinforcing members.

Preferably the mirror component is mounted to the second member such that the mirror component is rearward of the second member; that is to say, the second component is forward of the mirror component in the direction of vehicle travelling forward and does not interfere with the driver's vision in the mirror component. Moreover, such arrangement allows the first member in the second member to be constructed in a manner whereby they can be shaped to withstand wind forces without interfering with the driver's vision.

In a further preferred form, lighting means is provided on an outer upper forward portion of the mirror component when in the overlying position. The lighting means is suitably of the kind which drivers would use to indicate a change of direction, such as turning or changing lanes. In such form, the lighting means has a lens arranged for visibility from a wide range of angles, including from behind as well as from on top so that the indicator is visible from the side when the mirror component is in either the overlying position or the outlying position.

In one preferred form, the second member is arranged to slide longitudinally relative to the first member or portion to thereby move from the retracted position to the extended position. In such form, it is preferred that the first member or portion and the second member are constructed so as to incorporate keying means which prevent the second member rotating relative to the first member or portion through an arc about the longitudinal axis of the first member or portion. In one preferred form, the first member or portion and the second member have complementary noncircular cross-sectional shapes such as rectangular whereby one can slide tightly inside the other without any relative rotational movement. However, in another form, one or more protrusions or a single longitudinal protrusion and a complementary longitudinal recess are provided respectively on the first member or portion and the second member respectively to prevent relative rotational movement therebetween.

In this specification, the terms "vertical" and "horizontal" have been used to differentiate two degrees of freedom or two general modes of movement. However, those terms are intended only to express a general orientation to achieve rotational movement forwards and backwards in the general direction of travel and inwards and outwards away from the vehicle cabin and upwards and downwards to achieve rotational movement towards and away from the vehicle cabin and are not to be construed as limiting the invention to any particular orientation.

In order that the invention may be more clearly understood and put into practical effect, reference will now be made to the accompanying drawings wherein.

Figure 15:
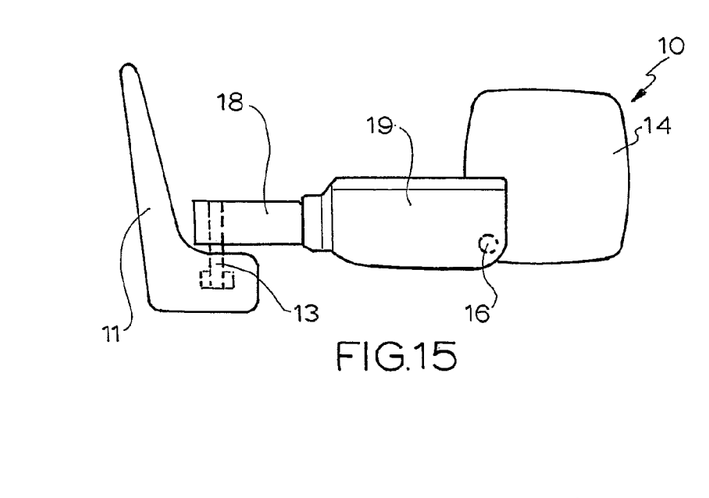
FIG. 15 is a front elevation of the towing mirror of FIG. 1 viewed from the rear of the vehicle on which it would be mounted in a fully extended position.
Figure 16:
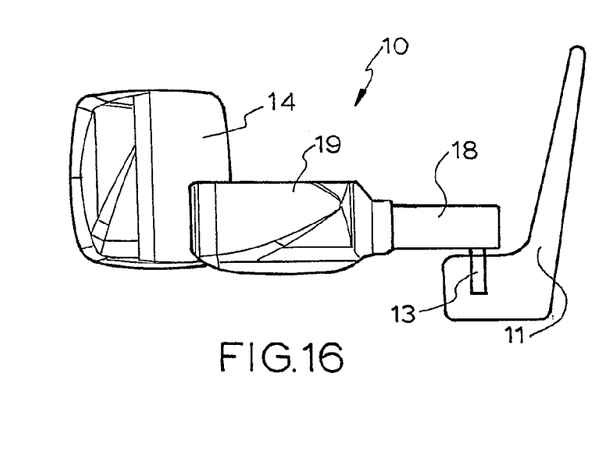
FIG. 16 is a rear elevation of the towing mirror of FIG. 1 when viewed from the front of the vehicle in the position of FIG. 15.
Figure 17:
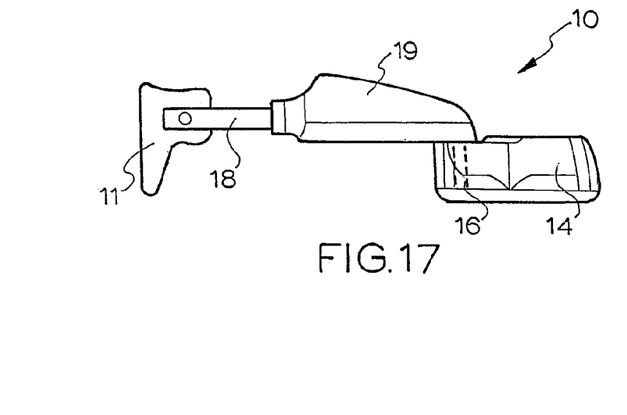
FIG. 17 is a plan view of the towing mirror of FIG. 1 viewed from above in the position of FIG. 15.
Figure 18:
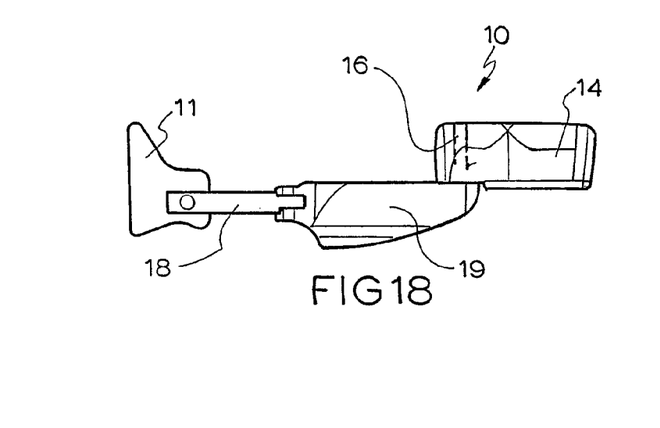
FIG. 18 is a plan view of the towing mirror of FIG. 1 viewed from below in the position of FIG. 15.
Figure 19:
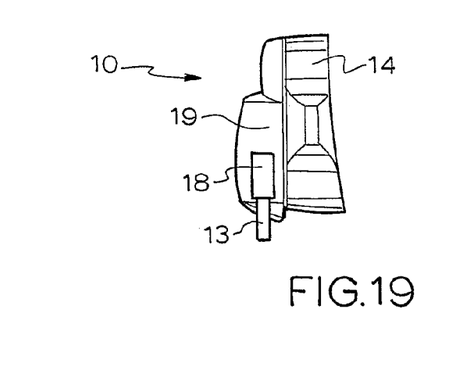
FIG. 19 is a side elevation of the towing mirror of FIG. 1 viewed from the outside of the vehicle in the position of FIG. 15.
Figure 20:
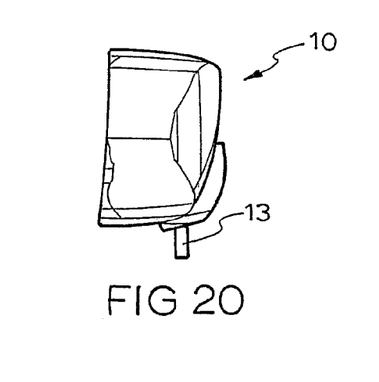
FIG. 20 is a side elevation of the towing mirror of FIG. 1 viewed from inside the vehicle in the position of FIG. 15.
Figure 21:
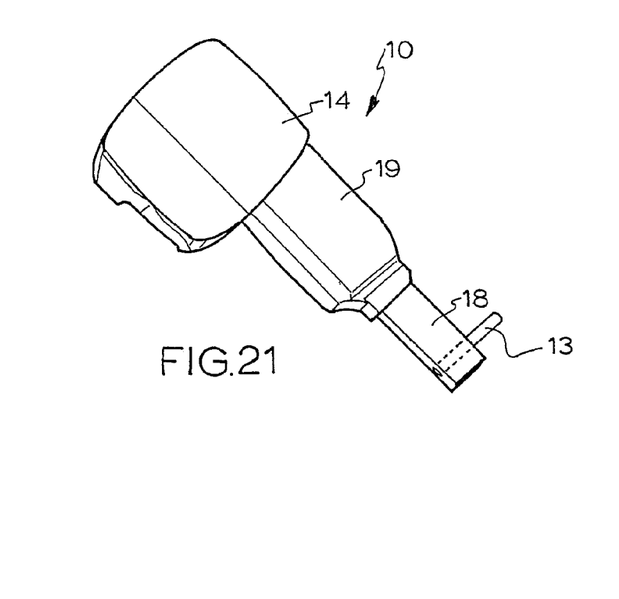
FIG. 21 is a pictorial representation of the towing mirror of FIG. 1 from one side in the position of FIG. 15 but removed from its mount.
Figure 22:
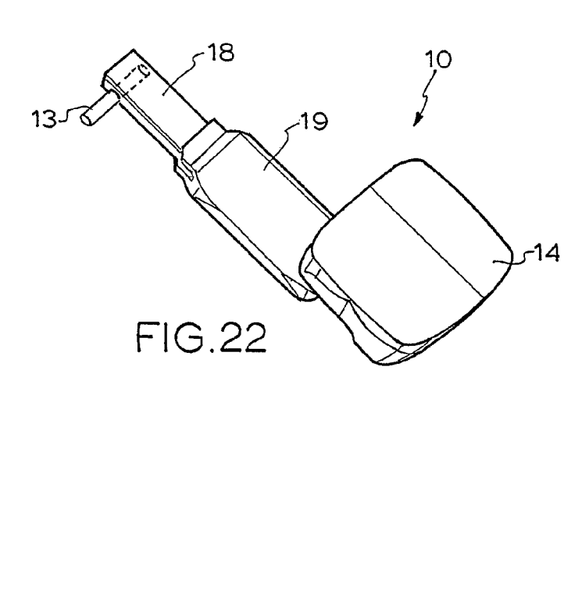
FIG. 22 is a pictorial representation of the towing mirror of FIG. 1 from the other side in the position of FIG. 15 but removed from its mount.
Figure 23:
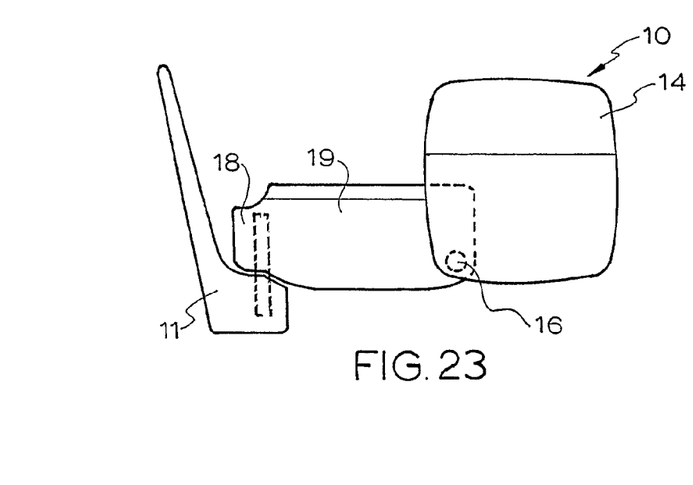
FIG. 23 is a front elevation of the towing mirror of FIG. 1 viewed from the rear of the vehicle on which it would be mounted in an alternative part extended position.
Figure 24:
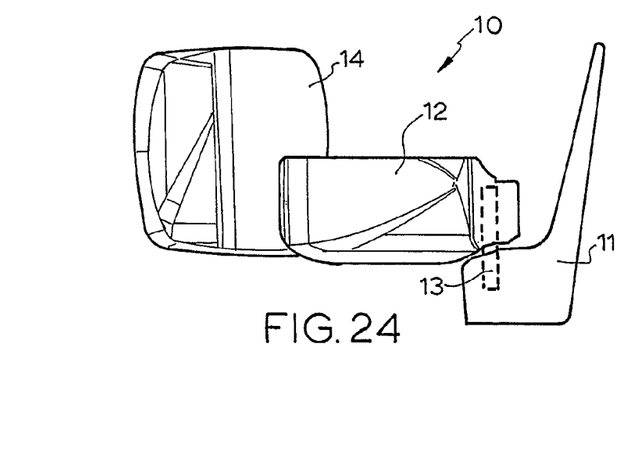
FIG. 24 is a rear elevation of the towing mirror of FIG. 1 when viewed from the front of the vehicle in the position of FIG. 23.
Figure 25:
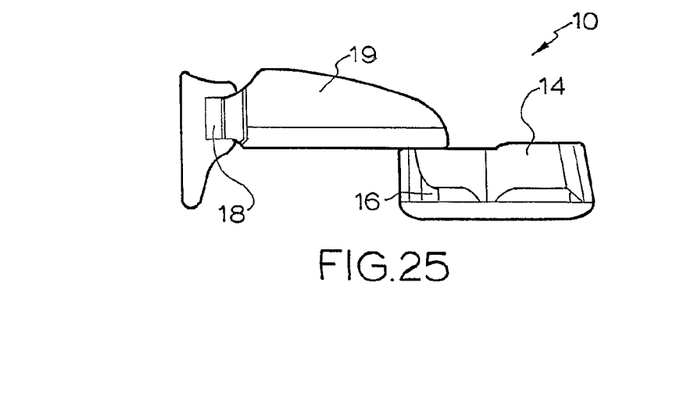
FIG. 25 is a plan view of the towing mirror of FIG. 1 viewed from above in the position of FIG. 23.
Figure 26:
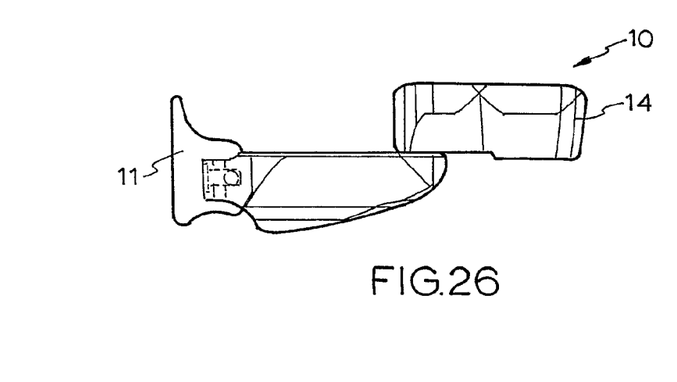
FIG. 26 is a plan view of the towing mirror of FIG. 1 viewed from below in the position of FIG. 23.
Figure 27:
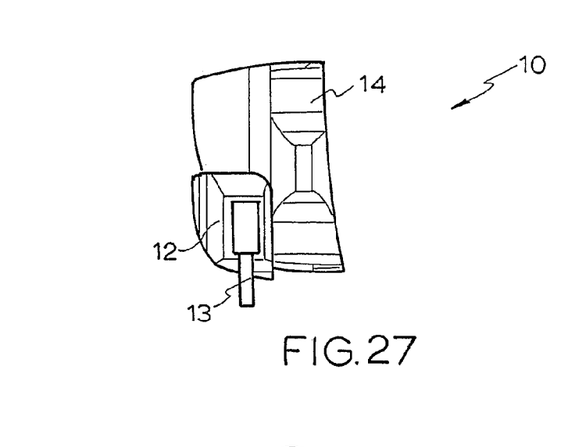
FIG. 27 is a side elevation of the towing mirror of FIG. 1 viewed from the outside of the vehicle in the position of FIG. 23.
Figure 28:
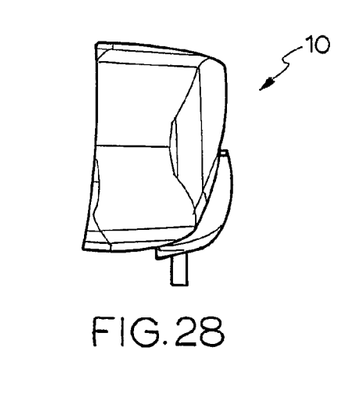
FIG. 28 is a side elevation of the towing mirror of FIG. 1 viewed from inside the vehicle in the position of FIG. 23.
Figure 29:
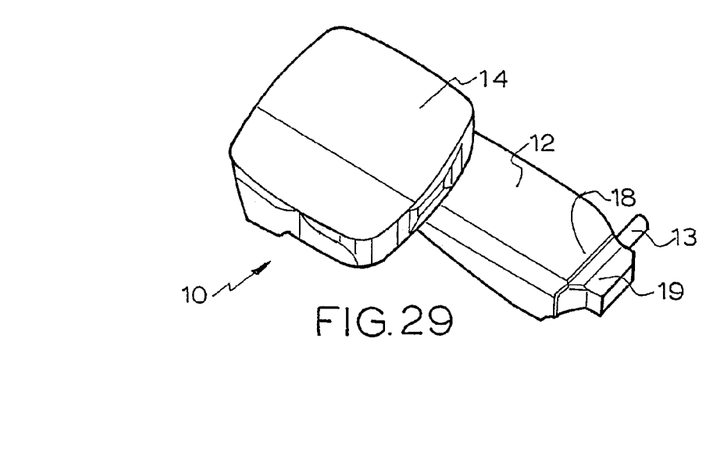
FIG. 29 is a pictorial representation of the towing mirror of FIG. 1 from one side in the position of FIG. 23 but removed from its mount.
Figure 30:
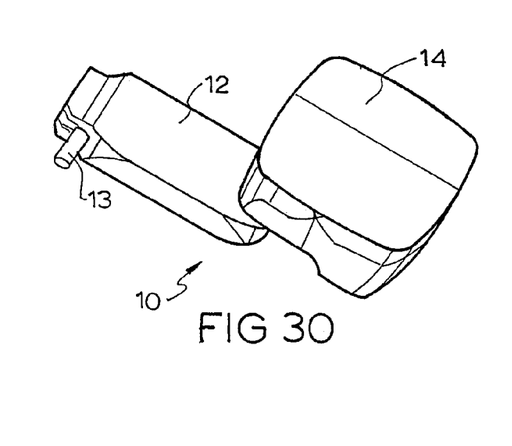
FIG. 30 is a pictorial representation of the towing mirror of FIG. 1 from the other side in the position of FIG. 23 but removed from its mount.

The towing mirror or mirror assembly 10 illustrated in FIGS. 1 to 30 includes a mount 11 adapted to be mounted to the outer skin of the door of a vehicle, an extension component 12 connected at one end to the mount 11 by a vertical pivot pin 13, and a mirror or mirror component 14 connected to the other end of the extension component by a horizontal pivot pin 16 which can be more clearly seen in FIG. 15.

Figure 1:
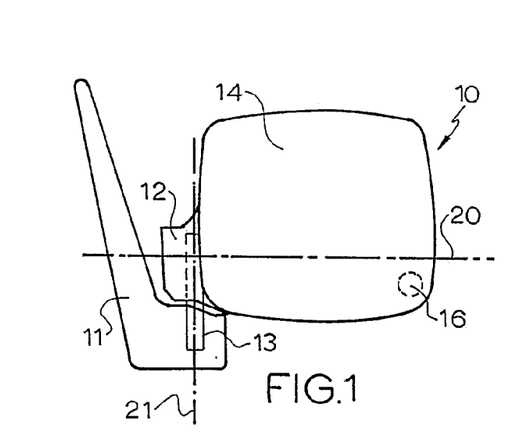
FIG. 1 is a front elevation of a towing mirror according to the invention adapted to be mounted to the right-hand side of the vehicle and viewed from the rear of the vehicle on which it would be mounted in its fully retracted position.
Figure 2:
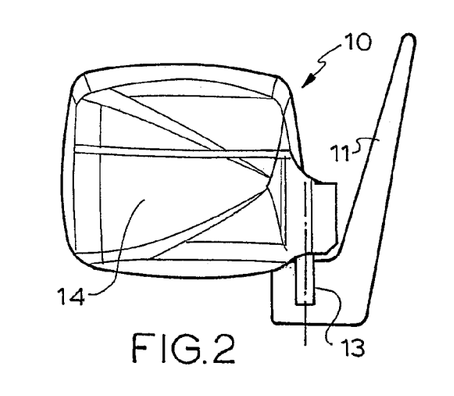
FIG. 2 is a rear elevation of the towing mirror of FIG. 1 when viewed from the front of the vehicle.
Figure 3:
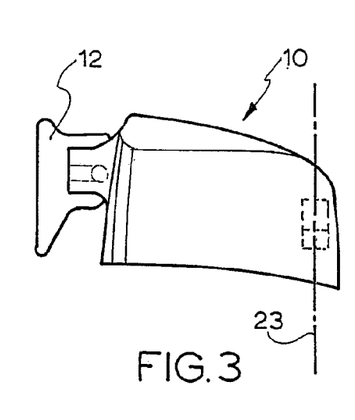
FIG. 3 is a plan view of the towing mirror of FIG. 1 viewed from above.
Figure 4:
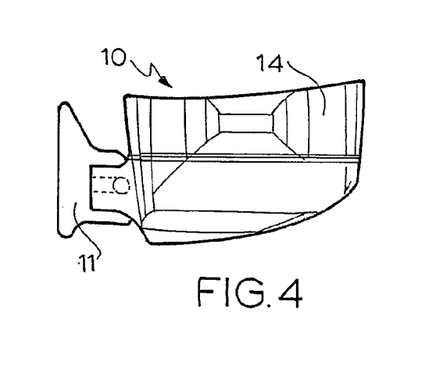
FIG. 4 is a plan view of the towing mirror of FIG. 1 viewed from below.
Figure 5:
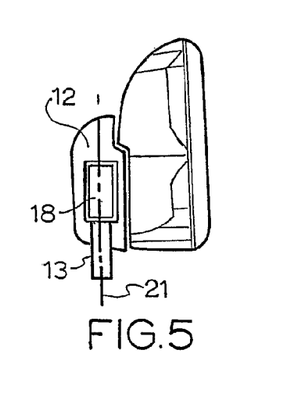
FIG. 5 is a side elevation of the towing mirror of FIG. 1 viewed from the outside of the vehicle.
Figure 6:
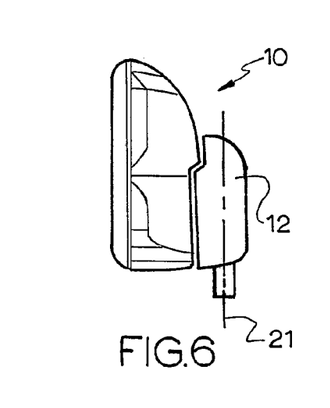
FIG. 6 is a side elevation of the towing mirror of FIG. 1 viewed from inside the vehicle.
Figure 7:
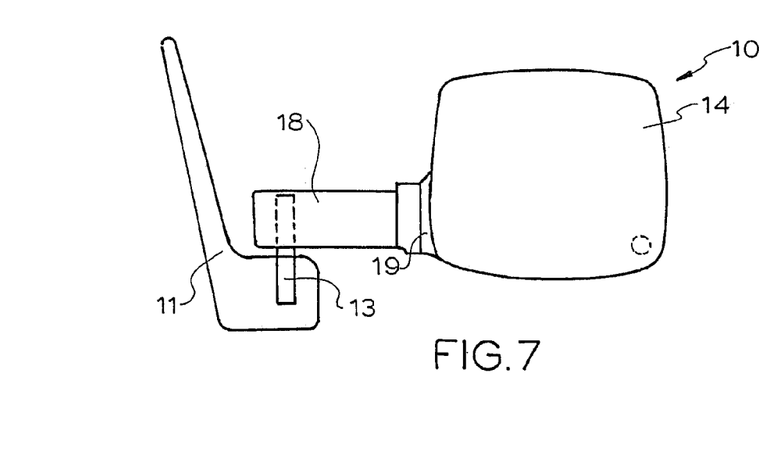
FIG. 7 is a front elevation of the towing mirror of FIG. 1 viewed from the rear of the vehicle on which it would be mounted in a part extended position.
Figure 8:
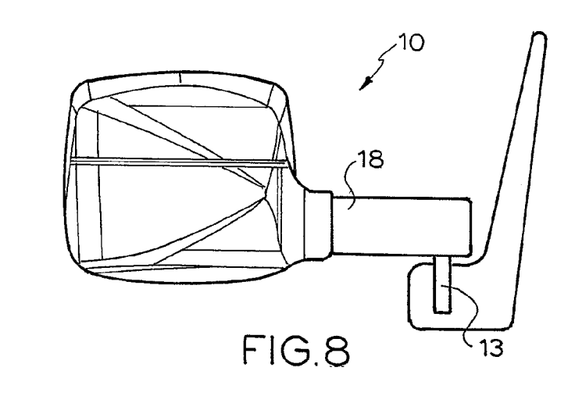
FIG. 8 is a rear elevation of the towing mirror of FIG. 1 when viewed from the front of the vehicle in the position of FIG. 7.
Figure 9:
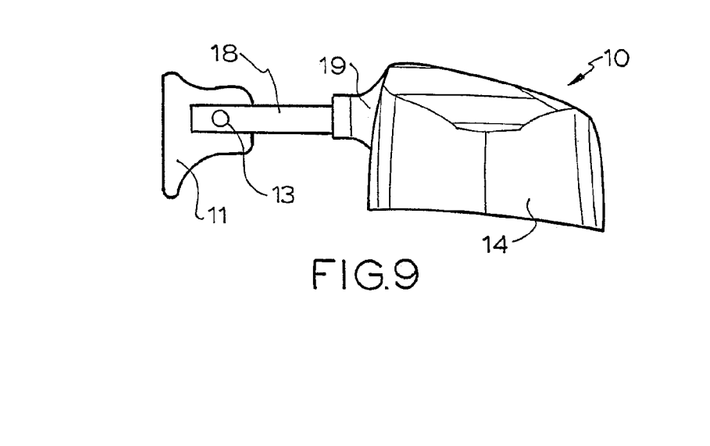
FIG. 9 is a plan view of the towing mirror of FIG. 1 viewed from above in the position of FIG. 7.
Figure 10:
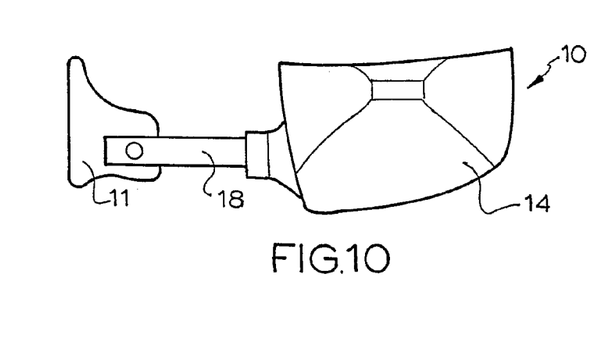
FIG. 10 is a plan view of the towing mirror of FIG. 1 viewed from below in the position of FIG. 7.
Figure 11:
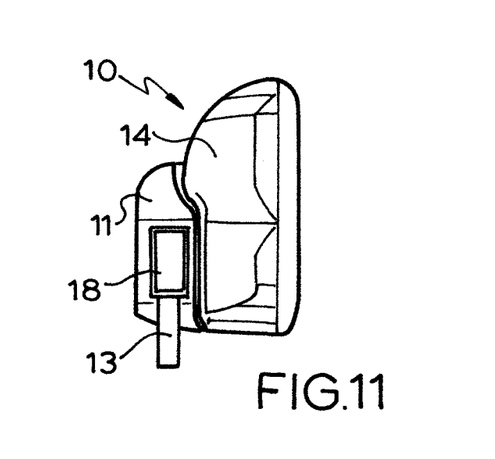
FIG. 11 is a side elevation of the towing mirror of FIG. 1 viewed from the outside of the vehicle in the position of FIG. 7.
Figure 12:
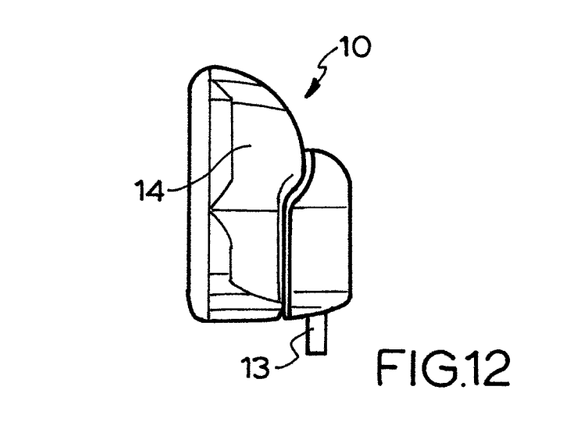
FIG. 12 is a side elevation of the towing mirror of FIG. 1 viewed from inside the vehicle in the position of FIG. 7.
Figure 13:
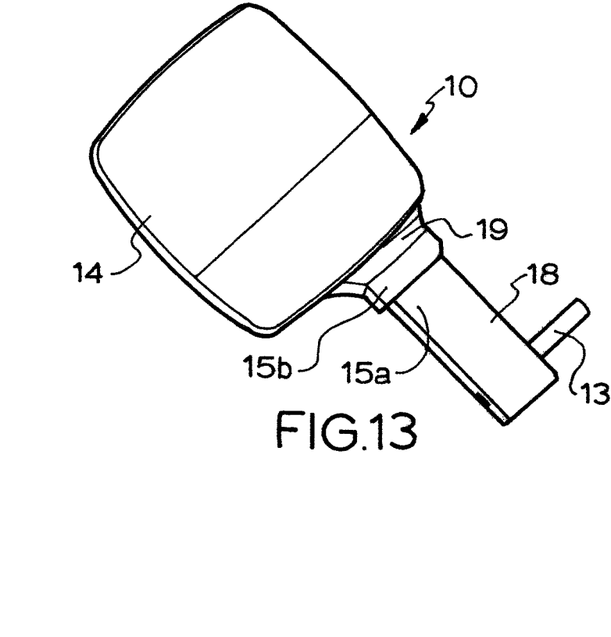
FIG. 13 is a pictorial representation of the towing mirror of FIG. 1 from one side in the position of FIG. 7 but removed from its mount.
Figure 14:
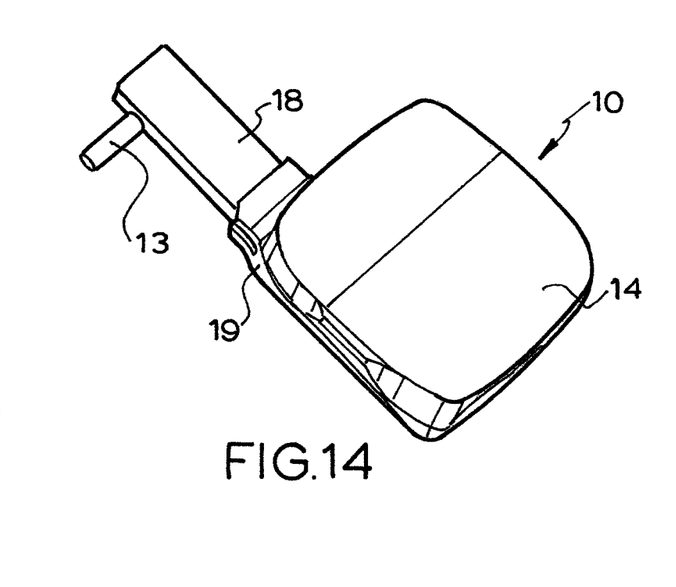
FIG. 14 is a pictorial representation of the towing mirror of FIG. 1 from the other side in the position of FIG. 7 but removed from its mount.

Advantageously, the extension component 12 comprises a first member 18 to which the vertical pivot pin 13 is fixed at its proximal or inner end and a second member 19 which is slidably mounted on the first component for longitudinal movement relative thereto along a horizontal axis 20 shown in FIG. 1, that is, towards and away from the mount 11 as required. Notably, the pivot pin 13 is engaged in a complementary bore provided in the mount and secured therein by a circlip or similar means (not shown) for pivoting movement relative to the mount about a vertical axis 21. Notably, the first member is a substantially rectangular in outer shape and slides in a complementary rectangular shaped cavity in the second member, the rectangular shape of both being such as to prevent relative rotation between the two components about the longitudinal axis 20, thereby forming keying means 15a and 15b between the two components.

The mirror component 14 in turn is mounted to the outer or distal end of the second member 19 of the extension component for pivoting movement about a horizontal axis 23 which extends generally in the direction of travel of the vehicle to which the mount 11 is to be secured.

It will be appreciated that the mirror is in the retracted position shown in FIGS. 1 to 6 for normal non-towing driving of the vehicle. In that position, the mirror is relatively close to the vehicle cabin to which the mount is secured with the extension component fully retracted with the first extension member almost fully encompassed by the second extension member while the mirror component is disposed almost fully behind the extension component, that is, in a position most distal to the vehicle cabin.

It will also be appreciated that the mirror is in a first extended position shown in FIGS. 7 to 14 whereby the extension component 12 is a fully extended, that is, with the second extension member drawn along the first extension member so that the mirror component is in a middle disposition further from the vehicle cabin but in the same attitude as shown in FIGS. 1 to 6.

Further, it will also be appreciated that the mirror is in a second or fully extended position shown in FIGS. 15 to 22 whereby the extension component 12 is fully extended as in FIGS. 7 to 14 but in the fully extended position the mirror component has been rotated through 90° in a clockwise direction when viewed from the rear of the vehicle thereby placing the mirror component further from the vehicle. This is achieved by the horizontal pivot pin 16 being mounted in corner portion 31 of the mirror component, that corner portion being the outermost portion when in the retracted position and then becoming the innermost portion when in the extended disposition.

Figure 31:
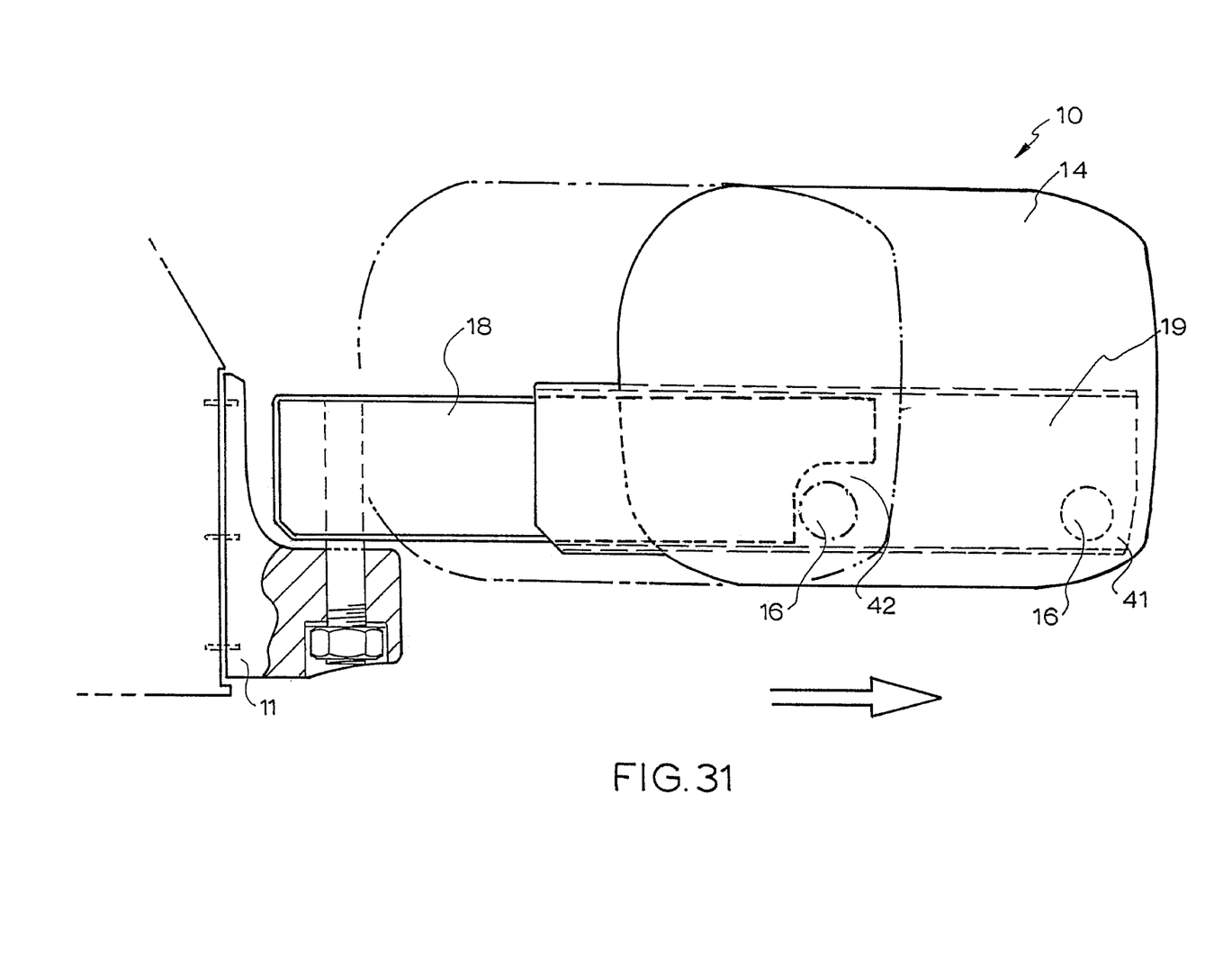
FIG. 31 is an enlarged schematic elevation of the towing mirror illustrated in FIG. 15 with a slightly different mirror.

As can be more clearly seen in FIG. 31, the horizontal pivot pin 16 extends from a lower outermost corner 41 of the second extension member or portion 19 and is arranged so that it fits into a recess 42 provided in the first extension member when the extension component is fully retracted.

Advantageously, such arrangement allows the extension component 12 to maximise its slidable length while at the same time maximises the vertical and horizontal extent to which the mirror component can pivot about the horizontal axis 16 thereby maximising the extension of the towing mirror. It will be appreciated that selection of different shaped mirrors provides for higher or wider vision depending on the circumstances but the minimum width of the retracted mirror assembly is substantially determined by the width of the mirror when in the fully retracted position and that width determines the height of the mirror when in the 90° arc position as shown in FIG. 15 or the 180° arc position (not shown).

Various positions of the extension component can be set by way of a spring-loaded detent in one component engaging with a mating seat in the other component. Thus, the extension component might have an inner position seat, and outer position seat and one or two intermediate seats so that any desired one of those positions can be selected. Similarly, a spring-loaded detent can be provided in the mirror component to engage with a 0° arc seat in the outer extension member, a 90° arc seat and a 180° arc seat if desired to achieve the desired purpose.

Figure 32:
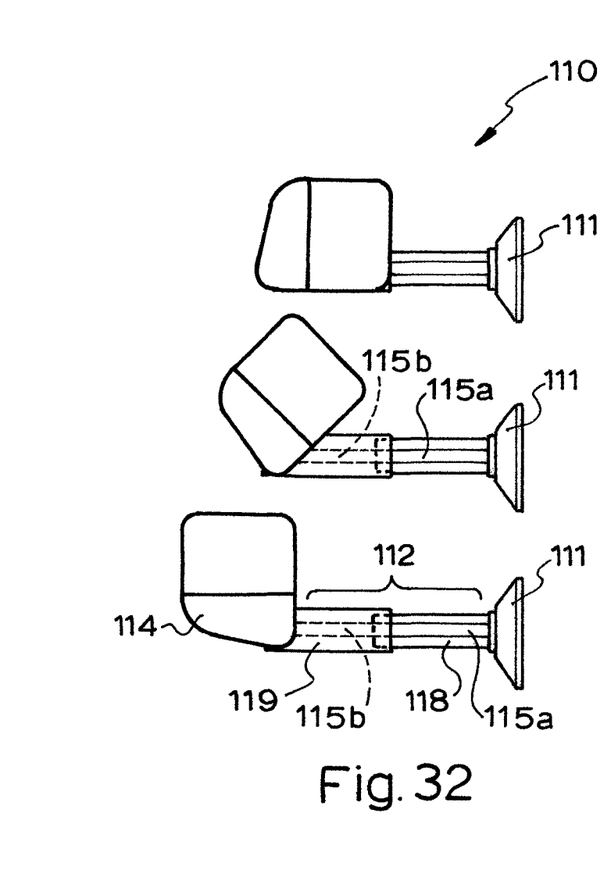
FIG. 32 is a front elevation of another towing mirror according to the invention adapted to be mounted to the left-hand side of the vehicle and viewed from the rear of the vehicle on which it would be mounted intended to show movement of the mirror component from the part extended position to the fully extended position.
Figure 33:
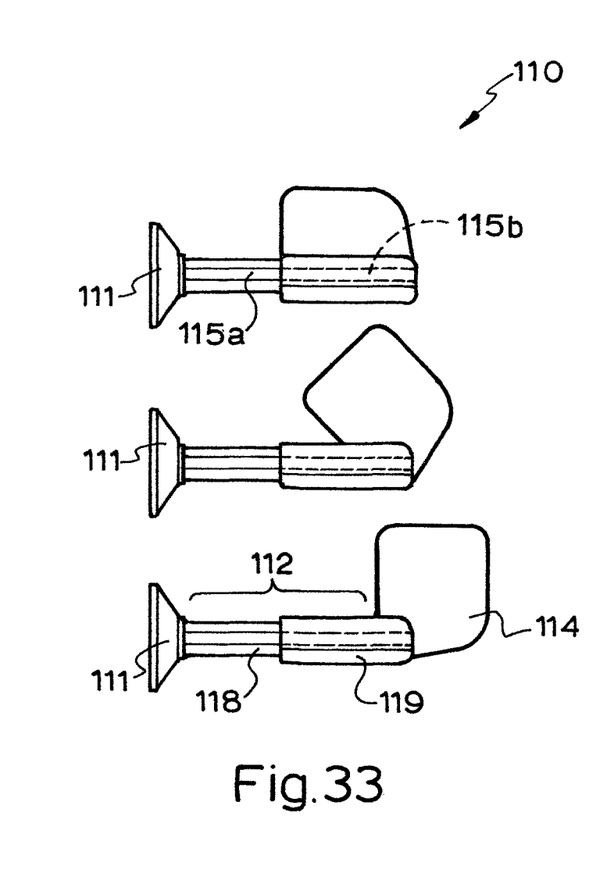
FIG. 33 is a rear elevation of the towing mirror of FIG. 31 in the same positions as in FIG. 31 but viewed from the front of the vehicle.

The towing mirror 110 illustrated in FIGS. 32 and 33 is similar to the towing mirror 10 illustrated in FIGS. 1 to 31 in many respects and consequently, corresponding reference numbers are used to reference corresponding features except prefaced by a "1". The main difference is that the extension component 112 is not pivotally mounted to the mount 111. It still comprises a first extension member 118 and a second extension member 119 which is slidably mounted on extension member 118, but extension member 118 is immovably fixed to the mount 111. That is to say, whereas the extension member 18 in mirror assembly 10 is pivotally mounted to mount 11, in this particular mirror assembly 110, there is no pivot action provided for between the extension member 118 and the mount 111. However, the extension component 112 comprising the inner member 118 and the outer member 119 operates in much the same manner as in the previous mirror assembly described and the mirror component 114 pivots about a horizontal axis relative to the extension member 119 in much the same manner as the previous mirror assembly. Also, as can be seen in FIGS. 32 and 33, the longitudinal protrusion 115a slides in longitudinal recess 115b to key the first and second extension members 118 and 119 together to prevent relative rotation between them.

Figure 34:
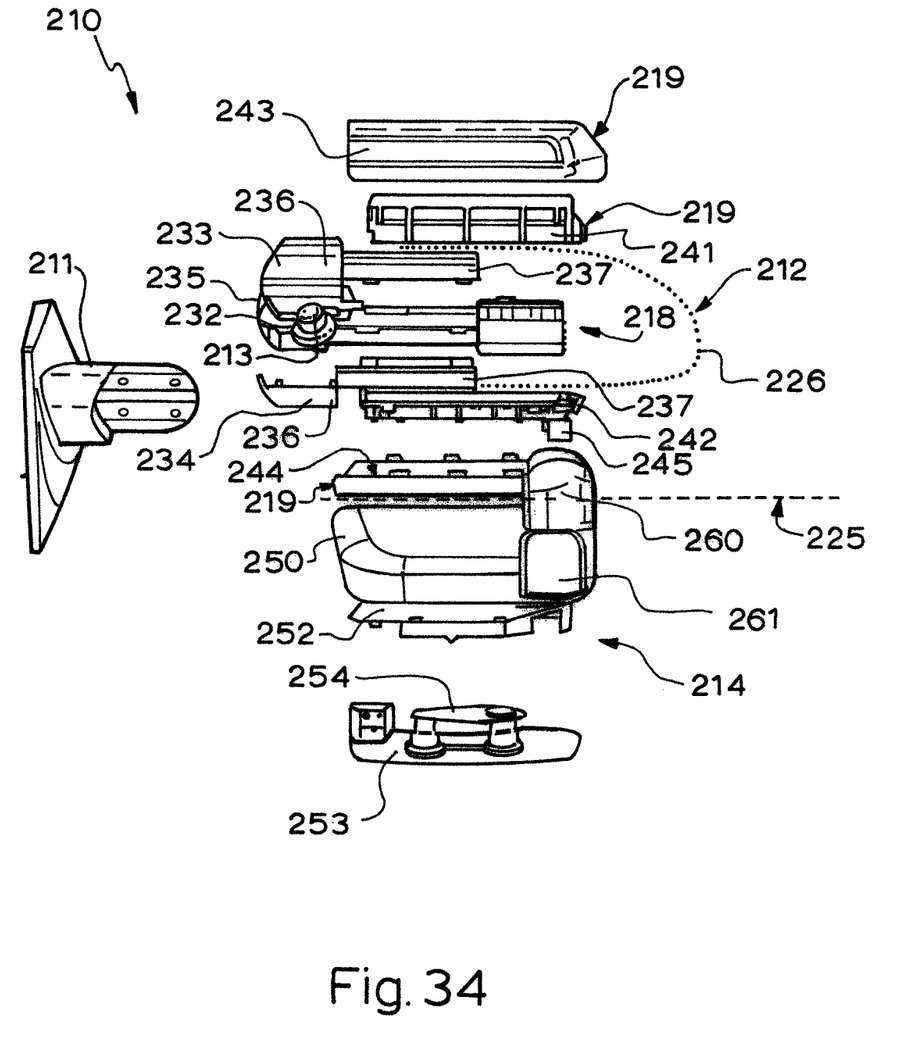
FIG. 34 is an exploded plan view from above of yet another towing mirror according to the invention adapted to be mounted to the right-hand side of the vehicle and showing parts making up the various components of the towing mirror.

The towing mirror 210 illustrated in FIG. 34 is similar in many respects to the towing mirror 10 illustrated in FIGS. 1 to 31 and consequently, corresponding reference numbers are used to reference corresponding features except prefaced by a "2". The towing mirror 210 is illustrated in FIG. 34 with more detail in respect of the components making up the various parts, but the reference numerals still commence with a "2" for consistency.

The extension component 212 is shown above the dotted line 225 and the mirror component 214 below the dotted line 225, except for a part covering the line and one of the parts described later. The first member 218 forms part of the extension component embraced by the double-dot dashed line 226 and the remaining parts of the extension component 212 form the second member 219.

The first member has a main part 232 covered by a first forward cover 233 and a first rearward cover 234 which are clipped together by mating parts or otherwise fastened together by fasteners such as screws or nuts and bolts. The first covers each have a proximal expanded portion 236 and an elongate distal portion 237 and each cover mates with the other to substantially encapsulate the main part. The man part has a pivot assembly 235 for the pivot 213.

The second member has a forward part 241 and rear part 242 which are fastened together by clips of fasteners to enclose the distal portion of the first member for sliding engagement therewith. A second forward cover 243 and a second rearward cover 244 are formed to clip together to cover the forward and rear parts, all being parts of the second member. The clip arrangement for fastening the covers together are arranged internally to provide an outside surface free from screw heads and the like. The rear part has a protuberance 245 extending rearwardly from the distal end to provide a accommodate a pivot pin (not shown).

The mirror component has a mirror cowling 250 which forms the main structural part, being pivoted to the distal end of the second component by way of the pivot pin associated with the protuberance 245, the location of the pivot being obstructed by another part described below. A mirror support frame 252 is mounted inside the mirror cowling and is operatively associated with a mirror cradle 253. A mirror (not shown) is mounted to the rear side of the mirror cradle and a 2-dimensional pivot assembly 254 is mounted intermediate the mirror cradle and the mirror support frame to provide the aforesaid operative association between the mirror cradle and the mirror support frame. The 2-dimensional pivot assembly provided for up and down and side-to-side rotation of the mirror cradle about one or two pivot points forward of the mirror cradle.

A lamp assembly 260 is mounted to the upper outer corner of the mirror cowling, an aperture 261 being provided therein to accommodate same. The lamp assembly has forward and rearward facing lamps providing multidirectional indicator lights as hereinbefore described. This is the part mentioned above which in the illustration covers the dotted line and the second rearward cover 244.

In use, two towing mirrors are provided for a motor vehicle according to the invention, each being opposite handed to the other. The towing mirrors are normally left in their fully retracted position when the vehicle is not towing anything. If a small towed vehicle is hitched to the towing vehicle, such as a trailer or small boat, one or both towing mirrors may be extended to their partially extended position by sliding the second member out from the first member. The first and second members have a spring loaded arrangement locking the second member in either the retracted or the extended position with respect to the first member so that the towing mirror is not inadvertently or unintentionally moved between positions such as by wind action against the towing mirrors when the vehicle is in motion.

For towing larger vehicles, such as caravans, large boats or other equipment, the towing mirrors may be extended to the full extent by pivoting the mirror outward, again against spring loading which locks the mirror component in either the overlying position (retracted) or the outlying position (extended).

While the foregoing description has been given by way of illustrative example of the invention, it will be understood that the invention may be embodied in many other forms and all such forms are deemed to fall within the broad scope and ambit of the invention as hereinbefore described.

What is claimed is:

1. A permanent towing mirror comprising:
    a mount adapted to be mounted to a vehicle cabin;
    an extension component comprising a first member or portion extending from said mount and a second member operatively connected to said first member or portion for longitudinal movement relative thereto from a retracted position to an extended position;
    a mirror component operatively connected to said second member for pivoting movement relative thereto about a generally horizontal axis extending substantially in the intended direction of travel of the vehicle cabin to which the mirror is to be mounted between an inboard position and an outboard position;
    a mirror mounted in or to said mirror component for up and down and side to side pivoting movement relative thereto from the inboard position to the outboard position; and
    wherein said first member or portion and said second member include complementary keying means adapted to prevent said second member rotating relative to said first member or portion about the longitudinal axis of said first member or portion.

2. A permanent towing mirror according to claim 1, wherein said mirror component is substantially rectangular in form and said generally horizontal axis passes through said mirror component adjacent one end thereof.

3. A permanent towing mirror according to claim 2 wherein said mirror component is arranged to move through an arc from the inboard position in which said mirror component substantially overlies said second member of said extension component to the outboard position in which said mirror component is substantially beyond said second member.

4. A permanent towing mirror according to claim 3 wherein said generally horizontal axis is adjacent one corner of said mirror component.

5. A permanent towing mirror according to claim 4 wherein the arc of movement of the mirror component from the inboard position to the outboard position is about 90° whereby the mirror component in the outboard position is substantially above and outside said generally horizontal axis.

6. A permanent towing mirror according to claim 2 wherein said mirror component is mounted to said second member such that said mirror component is rearward of said second member.

7. A permanent towing mirror according to claim 2 wherein said complementary keying means is provided by said first member or portion and said second member having complementary noncircular cross-sectional shapes whereby one can slide tightly inside the other without relative rotational movement.

8. A permanent towing mirror according to claim 1 wherein said complementary keying means is provided by said first member or portion and said second member having complementary noncircular cross-sectional shapes whereby one can slide tightly inside the other without relative rotational movement.

9. A permanent towing mirror according to claim 1 wherein said keying means include a longitudinal protrusion and a complementary longitudinal recess respectively on the first member or portion and the second member to prevent relative rotational movement therebetween.

10. A permanent towing mirror comprising:
    a mount adapted to be mounted to a vehicle cabin;
    an extension component comprising a first member operatively connected at one end to said mount for pivoting movement relative thereto about a generally vertical axis and a second member operatively connected to said first member for longitudinal movement relative thereto from a retracted position to an extended position;

a mirror component operatively connected to said second member for pivoting movement relative thereto about a generally horizontal axis extending substantially in the intended direction of travel of the vehicle cabin to which the mirror is to be mounted and spaced from said vertical axis between an inboard position and an outboard position;

a mirror mounted in or to said mirror component for up and down and side to side pivoting movement relative thereto from the inboard position to the outboard position; and wherein said first member and said second member include complementary keying means adapted to prevent said second member rotating relative to said first member about the longitudinal axis of said first member.

11. A permanent towing mirror according to claim 10, wherein said mirror component is substantially rectangular in form and said generally horizontal axis passes through said mirror component adjacent one end thereof.

12. A permanent towing mirror according to claim 11 wherein said mirror component is arranged to move through an arc from the inboard position in which said mirror component substantially overlies said second member of said extension component to the outboard position in which said mirror component is substantially beyond said second member.

13. A permanent towing mirror according to claim 12 wherein said generally horizontal axis is adjacent one corner of said mirror component.

14. A permanent towing mirror according to claim 13 wherein the arc of movement of the mirror component from the inboard position to the outboard position is about 90° whereby the mirror component in the outboard position is substantially above and outside said generally horizontal axis.

15. A permanent towing mirror according to claim 11 wherein said mirror component is mounted to said second member such that said mirror component is rearward of said second member.

16. A permanent towing mirror comprising:

a mount adapted to be mounted to a vehicle cabin;

an extension component comprising a first member or portion extending from said mount and a second member operatively connected to said first member or portion for longitudinal movement relative thereto from a retracted position to an extended position; and a mirror component operatively connected to said second member for pivoting movement relative thereto about a generally horizontal axis extending substantially in the intended direction of travel of the vehicle cabin to which the mirror is to be mounted between an inboard position and an outboard position;

wherein said mirror component includes a structural part and a mirror part, said mirror part being operatively connected to said structural part for up and down and side to side movement about one of more pivot axes from the inboard position to the outboard position; and wherein said first member or portion and said second member include complementary keying means adapted to prevent said second member rotating relative to said first member or portion about the longitudinal axis of said first member or portion.

17. A permanent towing mirror according to claim 16 wherein said complementary keying means are provided by said first member or portion and said second member having complementary noncircular cross-sectional shapes whereby one can slide tightly inside the other without relative rotational movement.

* * * * *